United States Patent Office 2,902,483
Patented Sept. 1, 1959

2,902,483
9β,11β-OXIDO-16-METHYLENE PREGNENE DERIVATIVES

Eugene J. Agnello and Gerald D. Laubach, Jackson Heights, N.Y., assignors to Chas. Pfizer & Co., Inc., New York, N.Y., a corporation of Delaware No Drawing. Application December 22, 1958
Serial No. 781,834

6 Claims. (Cl. 260—239.55)

This application is concerned with new and useful steroid compounds. More particularly it is concerned with intermediates in the preparation of new and useful, therapeutically active, 16-methylene pregnane derivatives.

This application is, in part, a continuation of patent application, Serial No. 740,598, filed June 9, 1958, now Patent No. 2,865,808 issued Dec. 23, 1958, describing and claiming the therapeutically active 16-methylene pregnane derivatives.

The useful compounds of this invention are represented by the formulas

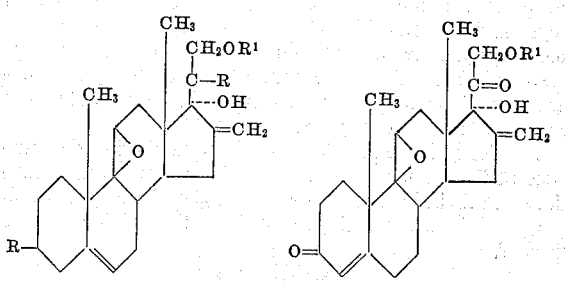

and the $\Delta^1$-, $\Delta^6$- and $\Delta^{1,6}$-derivatives of the 3,20-diketo compounds wherein R is an alkylenedioxy group containing from two to three carbon atoms and $R^1$ is hydrogen or an acyl hydrocarbon group containing up to four carbon atoms.

As will be illustrated more fully hereinafter, these compounds are useful for the preparation of therapeutically active compounds represented by the formula

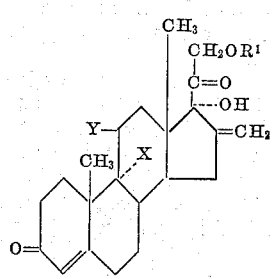

and the $\Delta^1$-, $\Delta^6$- and $\Delta^{1,6}$-derivatives thereof wherein X is selected from the group consisting of hydrogen, halogen, methoxy and ethoxy, Y is keto or β-hydroxyl and $R^1$ has the same meaning as above.

A suitable starting compound for the preparation of the valuable compounds of this invention is represented by the formula

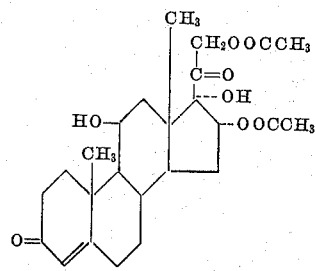

This compound is prepared in accordance with the procedure of Allen and Bernstein as reported in the Journal of the American Chemical Society, vol. 78, page 1909.

The synthesis of the $\Delta^{1,4,6}$-compounds within the purview of this invention is illustrated by the following outline. The outline also shows the use of these compounds in the preparation of the valuable therapeutic agents illustrated above.

In the first step of the synthesis of the valuable intermediates of this invention, the 16,21-diacetate prepared in accordance with Allen's procedure is dehydrated with methane sulfonyl chloride in pyridine according to known procedures illustrated in the appended examples to prepare a $\Delta^{9,11}$-compound.

The 9β,11β-oxide is next prepared by treating the $\Delta^{9,11}$-compound first with N-bromoacetamide and perchloric acid in peroxide free dioxane. The resulting bromohydrin is treated with an alkaline reagent such as potassium acetate to convert the bromohydrin to the oxide. This procedure is fully illustrated in the appended examples.

The 3,20-bis-diketal is next prepared. For this preparation the preceding diacetate is first hydrolyzed, then converted to a diketal and then reacetylated. These reactions are well known in the art and are illustrated in the appended examples.

Alkaline hydrolysis of the resulting diketals yields a 16,21-diol. This reaction is carried out using, for example, 2 molar portions of potassium carbonate in aqueous methanol solution.

The 16,21-diol is next selectively acylated at the 21-position. Although other acylating agents can be used, it is preferred to use an equivalent of acetic anhydride in pyridine because of the ready availability of these compounds and high yields which can be obtained by their use. Selective acylation at the 21-position is a well known and simple reaction which can be readily carried out without concurrent acylation of the other hydroxyl groups in the molecule.

Conversion of the 16α-ol-21-acetate to a 16-keto compound is readily accomplished with standard and well known oxidizing agents. It is preferred to use the chromic acid-pyridine complex since the reaction can be readily accomplished in high yields with minimum decomposition of starting material.

The 16-keto compound is next reacted with the Wittig reagent, that is, triphenylphosphine-methylene. The reaction is well known. Its application to steroids is illustrated by Sondheimer and Mechoulam in the Journal of the American Chemical Society, vol. 79, page 5029. The application to the preparation of the valuable compounds of this invention is fully illustrated in the appended examples.

The 3,20-diketo-21-acetate of the compound previously prepared is then prepared by simultaneous hydrolysis of the ketal and acetate together with formation of a 9,11-bromohydrin. This latter compound is converted to a 9,11-oxide and reacetylated in accordance with standard procedures.

A double bond at the 6(7)-position is introduced by treatment of the above compound with a quinone having an oxidation-reduction potential less than −0.5 at a temperature between 70° C. and 190° C. in an inert organic solvent having a boiling point of at least about 70° C. Suitable solvents include mononuclear aromatic hydrocarbons, mononuclear halogenated aromatic hydrocarbons, oxygenated polar alicyclic organic solvents and oxygenated polar aliphatic organic solvents. Typical solvents include tertiary butanol, n-amyl alcohol, hexanol, isoamyl alcohol, heptanol, 3-cyclohexanol, orthdichloro benzene, xylene, tertiary amyl alcohol, secondary amyl alcohol, benzene, toluene, acetic acid, propionic acid, butyric acid, butyl acetate, amyl acetate, hexyl acetate, butyl propionate, propyl propionate, and amyl propionate. The application of this reaction to the preparation of $\Delta^{4,6}$-androstadiene 9-halo compounds is illustrated in U.S. Patent No. 2,836,607, issued July 27, 1958. Its application to the preparation of the specific compounds of this invention is illustrated in the examples.

A double bond is introduced at the 1(2)-position of the preceding compound by contacting it with selenium dioxide in an inert organic solvent at an elevated temperature. Solvents which are useful for this reaction include, for example, tertiary butanol, tertiary pentanol, benzene, ethylene glycol diethers such as dibutyl Cellosolve, dipropyl ether, ethylene glycol and various other glycol ethers, phenetole, xylene, dioxane and naphthalene. Preferred conditions include the addition of a lower aliphatic acid particularly acetic acid to a tert-butanol mixture. In carrying out the reaction, it is generally preferred to utilize temperatures of from about 75° C. to about 200° C. for from about 1 hour to about 100 hours. Generally several molecular proportions of selenium dioxide are added during the reaction period. The application of this reaction is fully illustrated in copending patent application Serial No. 672,550, filed August 18, 1957. Its application to the specific compounds of this invention is fully illustrated in the appended examples.

The valuable compounds of this invention are used to produce therapeutic agents by opening the epoxide ring to produce a 9α-halo, methoxy or ethoxy compound having an 11β-hydroxyl group. These reactions are fully described by Fried et al. in the Journal of the American Chemical Society, vol. 79, page 1130. The application to the specific compounds of this invention are fully illustrated in the appended examples. The compounds prepared by these reactions are therapeutically active.

If desired, the 11β-hydroxyl group can be oxidized to an 11-keto group and compounds having this modification at the 11-position are also valuable therapeutic agents. This oxidation can be carried out by any of a number of well known procedures including oxidation with chromium trioxide, sodium dichromate, N-bromoacetamide and aluminum isopropoxide or aluminum tert-butoxide in the presence of a hydrogen acceptor such as acetone or cyclohexanone in an inert organic solvent such as benzene, toluene or xylene. It is preferred, however, to utilize the chromic acid-pyridine complex as the oxidizing agent since, as indicated above, in connection with the oxidation of the 16α-hydroxyl group, the yields obtained are excellent.

It will be noted, that the procedures described above produce compounds with either a halogen or an alkoxy group at the 9α-position. For the preparation of the compounds of this invention in which there is a hydrogen at the 9-position, a 9α-bromo compound prepared as described above is used. The bromine is removed using zinc and acetic acid by reactions well known in the art. The procedure is illustrated in the appended examples.

The synthesis illustrated above produces $\Delta^{1,4,6}$-compounds. Other therapeutically active compounds, for example, the $\Delta^{4}$-, the $\Delta^{1,4}$- and the $\Delta^{4,6}$-compounds can be prepared by obvious modifications of this basic synthesis. Thus, to prepare a $\Delta^{4}$-compound, the 9β,11β-oxide ring is opened with the appropriate reagent without resort to dehydrogenation with a quinone and selenium dioxide. For the preparation of the $\Delta^{1,4}$-compound, the $\Delta^{4}$-compound is treated with selenium dioxide only and for the preparation of the $\Delta^{4,6}$-compound, only a quinone is used.

As will be recognized by those skilled in the art, there are modifications of this basic procedure which can be applied without essentially departing from the scope of the invention, for example, in the preparation of the $\Delta^{1,4,6}$-compound selenium dioxide can be used before the application of the quinone reaction. As stated above, other dihydroxy compounds can be used to prepare the diketals. Esters other than acetates can be employed and alkaline hydrolysis reagents other than potassium carbonate are useful.

Although many of the reactions described above are applicable to compounds in which the 21-position carries a free hydroxyl group, for optimum results it is best that the hydroxyl group be acylated with an acyl hydrocarbon group containing up to four carbon atoms.

Since the 21-position hydroxyl group is the only primary alcohol group present in any of the molecules whether starting material intermediate or product, it may be readily esterified by standard methods. Although Fischer esterification and transesterification procedures may be employed, in general, it is preferred to form the esters by treatment with an acylating agent such as an acyl halide or anhydride in the presence of a tertiary base such as pyridine or dimethylaniline. Free alcohols are prepared from the corresponding esters by gentle hydrolysis, for example, by treatment with dilute potassium carbonate in aqueous methanol.

The following examples are given solely for the purpose of illustration and are not to be construed as limitations of this invention, many apparent variations of which are possible without departing from the spirit or scope thereof.

EXAMPLE I $\Delta^{4,9(11)}$-pregnadiene-16α,17α,21-triol-3,20-dione 16,21-diacetate A solution containing five g. of $\Delta^{4}$-pregnene-11β,16α,17α,21-tetrol-3,20-dione 16, 21-diacetate in 25 ml. of pyridine and 30 ml. of dimethylformamide is prepared. The solution is placed in a 3-necked flask to which is affixed a sealed stirrer, a dropping funnel and a condenser. The condenser and dropping funnel are protected with drying tubes. The mixer is cooled to −20° C. and a solution containing 4.6 ml. of methane sulfonyl chloride in five ml. of pyridine is added dropwise over a period of one hour with continued stirring. At the end of the hour, stirring is stopped, the reaction mixture allowed to come to room temperature and left standing for ten hours. At the end of this period, the solution is added dropwise to 750 ml. of ice cold water with stirring. The desired product precipitates and is recovered by filtration. It is dried and recrystallized from ethyl acetate.

EXAMPLE II

9α-bromo-$\Delta^{4}$-pregnene-11β,16α,17α,21-tetrol-3,20-dione 16,21-diacetate

To a suspension of 500 mg. of the product prepared in the previous example in 25 ml. of pure peroxide free dioxane and .4 ml. of 0.46 N perchloric acid there is added in the dark at room temperature with stirring over a one hour period 114 mg. of solid N-bromoacetamide. At the end of 25 minutes, all of the starting material dissolves and 2.5 ml. of sodium sulfite solution is added with stirring. A few grams of ice in 20 ml. of chloroform is added and the layers separated. The organic layer is washed twice with water while maintaining the temperature at about 20° C. by the occasional addition of ice. The organic solution is concentrated in vacuo and acetone is added. The mixture is maintained at a temperature of about 5° C. until crystals form and the desired product is recovered by filtration.

EXAMPLE III

9β,11β-oxido-Δ⁴-pregnene-16α,17α,21-triol-3,20-dione 16,21-diacetate

A solution of 2.3 g. of the compound prepared as described in the previous example in 75 ml. of dioxane is added to a solution of 15.8 g. of anhydrous potassium acetate in 160 ml. of absolute alcohol at a temperature just below the reflux temperature of the alcohol solution. The mixture is brought to reflux within 3 minutes and the reaction is allowed to proceed for a total of 40 minutes. After cooling in an ice bath, 400 ml. of ice water is added with stirring and the desired product precipitates. Successive crops of the desired product may be obtained by concentrating the mother liquor.

EXAMPLE IV

9β,11β-oxido-Δ⁵-pregnene - 16α,17α,21 - triol-3,20-dione 3,20-diethylene ketal 16,21-diacetate The compound of the previous example (2 g.) is hydrolyzed with aqueous 10% methanol according to standard procedures. It is precipitated from ice water, filtered and dried. This product is mixed with 15 ml. of ethylene glycol and 30 ml. of benzene and a small amount of water removed by azeotropic distillation. To the mixture there is added 50 mg. of p-toluene sulfonic acid monohydrate and the mixture refluxed and stirred for 20 hours with continuous removal of water. At the end of this period the solution is cooled and made basic by the addition of 5% aqueous sodium bicarbonate. The aqueous mixture is extracted with a 1:1 solution of benzene and ether, the organic layer separated, dried over anhydrous sodium sulfate and filtered. The filtrate is evaporated in vacuo, reacetylated as in Example VI and the desired product obtained in pure form by recrystallization from acetone-petroleum ether (boiling point 64–66° C.).

EXAMPLE V

9β,11β-oxido-Δ⁵-pregnene - 16α,17α,21 - triol-3,20-dione 3,20-diethylene ketal

The 16α,21-acetate prepared as described in the previous example is hydrolyzed to the corresponding diol by the addition of 2 molar portions of potassium carbonate in a 10% aqueous methanol solution of the diester. The mixture is allowed to stand at room temperature for 1 hour and then poured into ice water to precipitate the desired diol.

EXAMPLE VI

9β,11β-oxido-Δ⁵-pregnene - 16α,17α,21 - triol-3,20-dione 3,20-diethylene ketal 21-acetate A solution containing 1 g. of the 16,21-diol prepared as described in the previous example in 25 ml. of pyridine containing a molar equivalent of acetic anhydride is allowed to stand at room temperature for 8 hours. The desired 21-acetate is isolated in the conventional manner.

EXAMPLE VII

9α,11β-oxido-Δ⁵-pregnene - 17α,21 - diol - 3,16,20 - trione 3,20-diethylene ketal 21-acetate To 15 ml. of pyridine maintained at about 5° C. there is added 0.15 g. of chromic anhydride and the mixture allowed to warm spontaneously to room temperature. To this solution there is added 2 g. of the product prepared as described in the previous example in 20 ml. of pyridine and the mixture permitted to stand at about 25° C. for 24 hours. The solution is extracted with ether, the ether layer separated, washed twice with 5% aqueous hydrochloric acid at 10° C. and then with water. The organic layer is dried over anhydrous sodium sulfate, filtered and the desired product obtained by evaporation in vacuo.

EXAMPLE VIII

9β,11β-oxido - 16 - methylene-Δ⁵-pregnene - 17α,21 - diol-3,20-dione 3,20-diethylene ketal 21-acetate A 1 N ethereal solution of butyl lithium (9 ml.) is added to a suspension of 3.6 g. of methyltriphenylphosphonium bromide (prepared from methyl bromide and triphenylphosphine using the procedure described by Wittig in Ber., 87, 1318 (1954)) in 50 cc. of ether with swirling under nitrogen. The mixture is shaken in a nitrogen atmosphere for 2 hours and 0.5 equivalents of the product prepared in the previous example dissolved in 75 cc. of ether is added. The mixture is shaken for 5 hours and left standing overnight. The ether is distilled off while simultaneously adding tetrahydrofuran until most of the ether has been replaced with this latter solvent. The mixture is refluxed for 6 hours, cooled, diluted with water and extracted with ether. The organic layer is separated, washed with water, 5% hydrochloric acid and again with water. It is dried over anhydrous sodium sulfate, filtered and the filtrate evaporated in vacuo. The pure product is obtained by recrystallization from ethyl acetate.

EXAMPLE IX

9β,11β - oxido - 16 - methylene - Δ⁴ - pregnene-17α,21-diol-3,20-dione 21-acetate A mixture of 1 g. of the compound prepared in the previous example together with 20 ml. of 46% aqueous hydrobromic acid and an equal volume of chloroform is stirred vigorously at room temperature for 16 hours. The organic layer is separated, dried over anhydrous sodium sulfate, filtered and the solvent removed in vacuo. This product is reacetylated using the procedure described in Example VI and the residue is taken up in 40 ml. of dioxane and converted to the oxide using the procedure illustrated in Example III with appropriate quantities of reagents.

EXAMPLE X

9β,11β-oxido-16-methylene - Δ⁴,⁶ - pregnadiene - 17α,21-diol-3,20-dione 21-acetate A mixture containing 1.3 g. of the product prepared in the previous example and 3.0 g. of chloranil in 30 ml. tert-butanol is refluxed in a nitrogen atmosphere for 18 hours. The reaction mixture is then diluted with 250 ml. of chloroform. The solvent solution is washed with several small portions of 5% sodium hydroxide solution and then with water. It is dried over anhydrous sodium sulfate, filtered and concentrated in vacuo to leave the desired product as a residue.

EXAMPLE XI

9β,11β-oxido-16-methylene - Δ¹,⁴,⁶ - pregnatriene-17α,21-diol-3,20-dione 21-acetate A mixture of 0.8 g. of the product prepared in the previous example, 0.8 g. of selenium dioxide (freshly sublimed) and 10 ml. of t-butyl alcohol is heated in a nitrogen atmosphere for ten and one-half hours at 175° C. The solution is filtered and the desired product precipitated by the addition of water. It is isolated by filtration.

The foregoing procedure was used to prepare 9β,11β-oxido-16-methylene-Δ¹,⁴-pregnadiene - 17α,21 - diol-3,20-dione 21-acetate using the compound prepared in Example IX as a starting compound.

The procedures of the foregoing examples were utilized corresponding compounds in which the acetate group was replaced with propionate and butyrate groups and the ethylene ketal groups were replaced with propylene ketal groups.

EXAMPLE XII

*9α-bromo - 16 - methylene-Δ¹,⁴,⁶-pregnatriene-11β,17α,21-triol-3,20-dione 21-acetate*

To a solution of 250 mg. of the product prepared in the previous example in 5 ml. of glacial acetic acid and 5 ml. of carbon tetrachloride, there is added 0.4 ml. of 32% hydrobromic acid in acetic acid. After 10 minutes at room temperature 100 ml. of chloroform is added and the solution washed twice with equal volumes of water. The organic layer is dried over anhydrous sodium sulfate, filtered and the desired product isolated by evaporating at reduced pressure.

EXAMPLE XIII

*9α-chloro - 16 - methylene-Δ¹,⁴,⁶-pregnatriene-11β,17α,21-triol-3,20-dione 21-acetate*

A solution of 4 g. of the compound prepared in Example XI in 40 ml. of redistilled chloroform is prepared and 3.5 ml. of 0.45 N hydrogen chloride in chloroform solution is added over a 20 minute period. The reaction mixture is maintained at 0° C. for an additional hour. The chloroform solution is washed with water, separated, dried over anhydrous sodium sulfate, filtered and the desired product isolated by evaporation of the solvent in vacuo.

EXAMPLE XIV

*9α-iodo - 16 - methylene-Δ¹,⁴,⁶-pregnatriene-11β,17α,21-triol-3,20-dione 21-acetate*

A solution of 204 mg. of the compound prepared in Example XI in 20 ml. of chloroform is cooled to −20° C. and 0.4 ml. of 55% aqueous hydriodic acid is added. The mixture is agitated for 20 minutes. Water is added, the organic layer separated and carefully evaporated in vacuo to leave a crystalline residue of the desired product which can be purified by recrystallization from ethyl acetate below 40° C.

EXAMPLE XV

*9α-fluoro - 16 - methylene-Δ¹,⁴,⁶-pregnatriene-11β,17α,21-triol-3,20-dione 21-acetate*

Approximately 6 g. of anhydrous hydrogen fluoride is passed into a solution containing 5 g. of the compound prepared in accordance with the procedure of Example XI in 100 ml. of redistilled chloroform at 0° C. with constant stirring. The reaction mixture is maintained at this temperature for 2 hours and then made alkaline by the careful addition of aqueous sodium bicarbonate solution. The reaction mixture is extracted with chloroform, the organic layer dried over anhydrous sodium sulfate, filtered and the filtrate evaporated to leave the desired product as a residue.

EXAMPLE XVI

*9α-methoxy-16-methylene-Δ¹,⁴,⁶-pregnatriene-11β,17α,21-triol-3,20-dione 21-acetate*

A solution of the compound prepared as described in Example XI (5 g.) in 250 ml. of methanol and 1.9 ml. of 72% perchloric acid is allowed to remain at room temperature for 4 hours. The solution is neutralized with aqueous sodium bicarbonate and the methanol removed in vacuo. The mixture is extracted with chloroform and the chloroform evaporated under reduced pressure to provide the desired compound as the free alcohol which is converted to the corresponding acetate by acetylation with 5 ml. of acetic anhydride in an equal volume of pyridine for 15 hours. The crystalline product is obtained by evaporation of the solvent in vacuo.

EXAMPLE XVII

*9α-ethoxy - 16 - methylene-Δ¹,⁴,⁶-pregnatriene-11β,17α,21-triol-3,20-dione 21-acetate*

A solution of the compound prepared using the procedure described in Example XI (5 g.) in 250 ml. of ethanol and 1.9 ml. of 72% perchloric acid is allowed to remain at room temperature for 4 hours. The solution is neutralized with aqueous sodium bicarbonate and the methanol removed in vacuo. The mixture is extracted with chloroform and the chloroform evaporated under reduced pressure to provide the desired compound as the free alcohol which is converted to the corresponding acetate by acetylation with 5 ml. of acetic anhydride in an equal volume of pyridine for 15 hours. The crystalline product is obtained by evaporation of the solvent in vacuo.

The procedure of Example XI is applied identically to the product of Example IX to prepare 9β,11β-oxido-16-methylene-Δ¹,⁴-pregnadiene - 17α,21 - diol-3,20-dione 21-acetate and this product is treated in accordance with the procedures set forth in Examples XII through XVII to prepare:

9α-bromo - 16 - methylene-Δ¹,⁴-pregnadiene-11β,17α,21-triol-3,20-dione 21-acetate 9α-chloro - 16 - methylene-Δ¹,⁴-pregnadiene-11β,17α,21-triol-3,20-dione 21-acetate 9α-iodo - 16 - methylene - Δ¹,⁴ - pregnadiene-11β,17α,21-triol-3,20-dione 21-acetate 9α-fluoro - 16 - methylene-Δ¹,⁴-pregnadiene-11β,17α,21-triol-3,20-dione 21-acetate 9α-methoxy - 16-methylene-Δ¹,⁴-pregnadiene-11β,17α,21-triol-3,20-dione 21-acetate 9α-ethoxy - 16 - methylene-Δ¹,⁴-pregnadiene-11β,17α,21-triol-3,20-dione 21-acetate The procedures of Examples XII through XVII were applied to the product of Example IX to prepare the following compounds.

9α-bromo - 16 - methylene-Δ⁴-pregnene-11β,17α,21-triol-3,20-dione 21-acetate

9α-chloro - 16 - methylene-Δ⁴-pregnene-11β,17α,21-triol-3,20-dione 21-acetate

9α-iodo - 16 - methylene-Δ⁴-pregnene - 11β,17α,21-triol-3,20-dione 21-acetate

9α-fluoro - 16 - methylene-Δ⁴-pregnene-11β,17α,21-triol-3,20-dione 21-acetate

9α-methoxy - 16-methylene-Δ⁴-pregnene-11β,17α,21-triol-3,20-dione 21-acetate

9α-ethoxy - 16 - methylene-Δ⁴-pregnene-11β,17α,21-triol-3,20-dione 21-acetate

The procedures of Examples XII through XVII were applied to the product of Example X to prepare the following compounds.

9α-bromo - 16 - methylene-Δ⁴,⁶-pregnadiene-11β,17α,21-triol-3,20-dione 21-acetate 9α-chloro - 16 - methylene-Δ⁴,⁶-pregnadiene-11β,17α,21-triol-3,20-dione 21-acetate 9α-iodo - 16 - methylene-Δ⁴,⁶-pregnadiene - 11β,17α,21-triol-3,20-dione 21-acetate 9α-fluoro - 16 - methylene-Δ⁴,⁶-pregnadiene-11β,17α,21-triol-3,20-dione 21-acetate 9α-methoxy - 16-methylene-Δ⁴,⁶-pregnadiene-11β,17α,21-triol-3,20-dione 21-acetate 9α-ethoxy - 16 - methylene-Δ⁴,⁶-pregnadiene-11β,17α,21-triol-3,20-dione 21-acetate

EXAMPLE XVIII

9α-bromo-16-methylene-Δ$^{1,4,6}$-pregnatriene-17α,21-diol-3,11,20-trione 21-acetate Chromic anhydride (0.125 g.) is added to 15 ml. of pyridine at about 5° C. and the mixture allowed to warm spontaneously to room temperature. To this solution is added 25 g. of 9α-bromo-16-methylene-Δ$^{1,4,6}$-pregnatriene-11β,17α,21-triol-3,20-dione 21-acetate in 20 ml. of chloroform and the mixture allowed to stand at room temperature for 24 hours. The solution is extracted with ether and the organic layer washed twice with cold 5% aqueous hydrochloric acid and then with water. It is dried over anhydrous sodium sulfate, filtered and the desired product obtained by removal of the ether in vacuo.

The following compounds were prepared using the procedure of the above example.

9α-chloro - 16 - methylene-Δ$^{1,4,6}$-pregnatriene - 17α,21-diol-3,11,20-trione 21 acetate 9α-iodo - 16 - methylene - Δ$^{1,4,6}$-pregnatriene - 17α,21-diol-3,11,20-trione 21 acetate 9α-fluoro - 16 - methylene - Δ$^{1,4,6}$-pregnatriene - 17α,21-diol-3,11,20-trione 21 acetate 9α-methoxy - 16 - methylene-Δ$^{1,4,6}$-pregnatriene-17α,21-diol-3,11,20-trione 21 acetate 9α-ethoxy - 16 - methylene-Δ$^{1,4,6}$-pregnatriene - 17α,21-diol-3,11,20-trione 21 acetate 9α-bromo - 16 - methylene-Δ$^{1,4}$-pregnadiene-17α,21-diol-3,11,20-trione 21-acetate 9α-chloro - 16 - methylene-Δ$^{1,4}$-pregnadiene-17α,21-diol-3,11,20-trione 21-acetate 9α-iodo - 16 - methylene-Δ$^{1,4}$-pregnadiene-17α,21 - diol-3,11,20-trione 21-acetate 9α-fluoro - 16 - methylene-Δ$^{1,4}$-pregnadiene-17α,21-diol-3,11,20-trione 21-acetate 9α-methoxy - 16-methylene-Δ$^{1,4}$-pregnadiene-17α,21-diol-3,11,20-trione 21-acetate 9α-ethoxy - 16 - methylene-Δ$^{1,4}$-pregnadiene-17α,21-diol-3,11,20-trione 21-acetate 9α-bromo - 16 - methylene-Δ$^{4}$-pregnene-17α,21-diol-3,11,20-trione 21-acetate 9α-chloro - 16 - methylene-Δ$^{4}$-pregnene-17α,21-diol-3,11,20-trione 21-acetate 9α-iodo - 16 - methylene-Δ$^{4}$-pregnene - 17α,21-diol-3,11,20-trione 21-acetate 9α-fluoro - 16 - methylene-Δ$^{4}$-pregnene-17α,21-diol-3,11,20-trione 21-acetate 9α-methoxy - 16-methylene-Δ$^{4}$-pregnene-17α,21-diol-3,11,20-trione 21-acetate 9α-ethoxy - 16 - methylene-Δ$^{4}$-pregnene-17α,21-diol-3,11,20-trione 21-acetate 9α-bromo - 16 - methylene-Δ$^{4,6}$-pregnadiene-17α,21-diol-3,11,20-dione 21-acetate 9α-chloro - 16 - methylene-Δ$^{4,6}$-pregnadiene-17α,21-diol-3,11,20-dione 21-acetate 9α-iodo - 16 - methylene-Δ$^{4,6}$-pregnadiene - 17α,21-diol-3,11,20-dione 21-acetate 9α-fluoro - 16 - methylene-Δ$^{4,6}$-pregnadiene-17α,21-diol-3,11,20-dione 21-acetate 9α-methoxy - 16-methylene-Δ$^{4,6}$-pregnadiene-17α,21-diol-3,11,20-dione 21-acetate 9α-ethoxy - 16 - methylene-Δ$^{4,6}$-pregnadiene-17α,21-diol-3,11,20-dione 21-acetate

EXAMPLE XIX

16-methylene-Δ$^{1,4,6}$-pregnatriene-17α,21-diol-3,11,20-trione 21-acetate

A solution containing 25 mg. of 9α-bromo-16-methylene-Δ$^{1,4,6}$-pregnatriene-17α,21-diol-3,11,20-trione 21-acetate in 2 ml. of glacial acetic acid is treated portionwise with 48 mg. of zinc dust on the steam bath for a total of 15 minutes. The residual zinc was removed by configuration and the acetic acid solution evaporated to dryness in vacuo. The residue was recrystallized from acetone to yield the desired product in pure form.

This procedure was applied to other 9α-bromo-compounds of this series to prepare corresponding Δ$^{4}$-, Δ$^{1,4}$- and Δ$^{4,6}$-compounds.

EXAMPLE XX

16-methylene-Δ$^{1,4,6}$-pregnatriene-11β,17α,21-triol-3,20-dione 21-acetate A solution of 9α-bromo-16-methylene-Δ$^{1,4,6}$-pregnatriene-11β,17α,21-triol-3,20-dione 21-actate (100 mg.) in a solution containing 30 ml. of water and 5 ml. of alcohol was shaken with 1 g. of zinc dust at room temperature for 19 hours. The zinc dust is removed by centrifugation and washed with alcohol. The alcohol solution is concentrated in vacuo and the aqueous suspension extracted with chloroform. The residue from the chloroform extract is dissolved in 1:4 chloroform and benzene and and chromatographed with silica gel (Davison No. 923, 2 g.). Elution of the column with 1:1 chloroform and benzene provides the corresponding Δ$^{9(11)}$-compound (identified by its infrared spectra). The fraction containing this compound is followed by further fractions which are isolated by evaporation of the solvent and recrystallized from acetone to prepare the desired product.

This procedure was applied to other 9α-bromo compounds of this series to prepare corresponding Δ$^{4}$-, Δ$^{1,4}$- and Δ$^{4,6}$-compounds.

EXAMPLE XXI

The free 21-alcohols of the esters prepared as in the previous examples are each prepared by hydrolysis using an equivalent of potassium carbonate in 10% aqueous methanol solution. The mixture is allowed to stand at room temperature for one hour and then poured into ice water to precipitate the free alcohols.

EXAMPLE XXII

A variety of 21-esters of the compounds prepared in accordance with the procedure of Examples XII through XX are each prepared by treating each of the free alcohols of Example XXI with acylating agents by conventional methods. These include such compounds as the formate, the propionate, the butyrate, the hexanoate, the benzoate, the octanoate, the stearate, the eicosanoate, the hemisuccinate, the trimethyl acetate, the cyclohexylcarbonate, the cyclopentylpropionate, etc. The acid esters such as the hemisuccinate have the advantage that alkali metal and alkaline earth metal salts are prepared from them by treating with molar proportions of a base such as sodium bicarbonate, potassium bicarbonate or calcium carbonate. These salts, in addition to being biologically active are water soluble, an advantage not possessed by the steroid alcohols themselves or by ordinary esters thereof.

What is claimed is:

1. A compound selected from the group consisting of

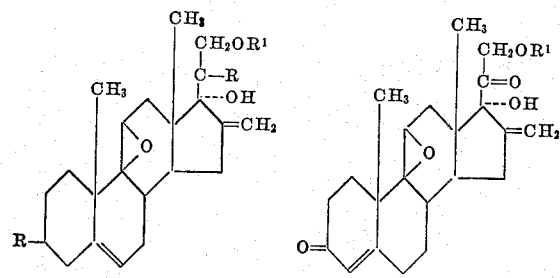

and the Δ$^{1}$-, Δ$^{6}$- and Δ$^{1,6}$-derivatives of the 3,20-diketo compounds wherein R is an alkylenedioxy group containing from two to three carbon atoms and R$^{1}$ is selected from the group consisting of hydrogen and acyl hydrocarbon containing up to four carbon atoms.

2. $9\beta,11\beta$ - oxido - 16 - methylene - $\Delta^5$ - pregnene-$17\alpha,21$-diol-3,20-dione-3,20-diethylene ketal 21-acetate.

3. $9\beta,11\beta$ - oxido - 16 - methylene - $\Delta^4$ - pregnene-$17\alpha,21$-diol-3,20-dione 21-acetate.

4. $9\beta,11\beta$ - oxido - 16 - methylene - $\Delta^{1,4}$ - pregnadiene-$17\alpha,21$-diol-3,20-dione 21-acetate.

5. $9\beta,11\beta$ - oxido - 16 - methylene - $\Delta^{4,6}$ - pregnadiene-$17\alpha,21$-diol-3,20-dione 21-acetate.

6. $9\beta,11\beta$ - oxido - 16 - methylene - $\Delta^{1,4,6}$-pregnatriene-$17\alpha,21$-diol-3,20-dione 21-acetate.

No references cited.